United States Patent [19]

Sales et al.

[11] Patent Number: 4,699,889
[45] Date of Patent: Oct. 13, 1987

[54] LEAD PHOSPHATE GLASS COMPOSITIONS FOR OPTICAL COMPONENTS

[75] Inventors: Brian C. Sales; Lynn A. Boatner, both of Oak Ridge, Tenn.

[73] Assignee: The United States of America as represented by the Department of Energy, Washington, D.C.

[21] Appl. No.: 861,390

[22] Filed: May 9, 1986

[51] Int. Cl.[4] .......................... C03C 8/10; C03C 8/08; C03C 3/16
[52] U.S. Cl. ........................................ 501/22; 65/3.11; 65/122; 65/134; 501/24; 501/37; 501/45; 501/900
[58] Field of Search ................... 65/2, 3.11, 134, 122; 501/22, 24, 37, 45, 900

[56] References Cited

U.S. PATENT DOCUMENTS 4,407,061  10/1983  Grodkiewicz et al. .......... 501/22 X Primary Examiner—Robert L. Lindsay
Attorney, Agent, or Firm—Katherine P. Lovingood; Stephen D. Hamel; Judson R. Hightower

[57] ABSTRACT

A lead phosphate glass to which has been added indium oxide or scandium oxide to improve chemical durability and provide a lead phosphate glass with good optical properties.

2 Claims, 1 Drawing Figure

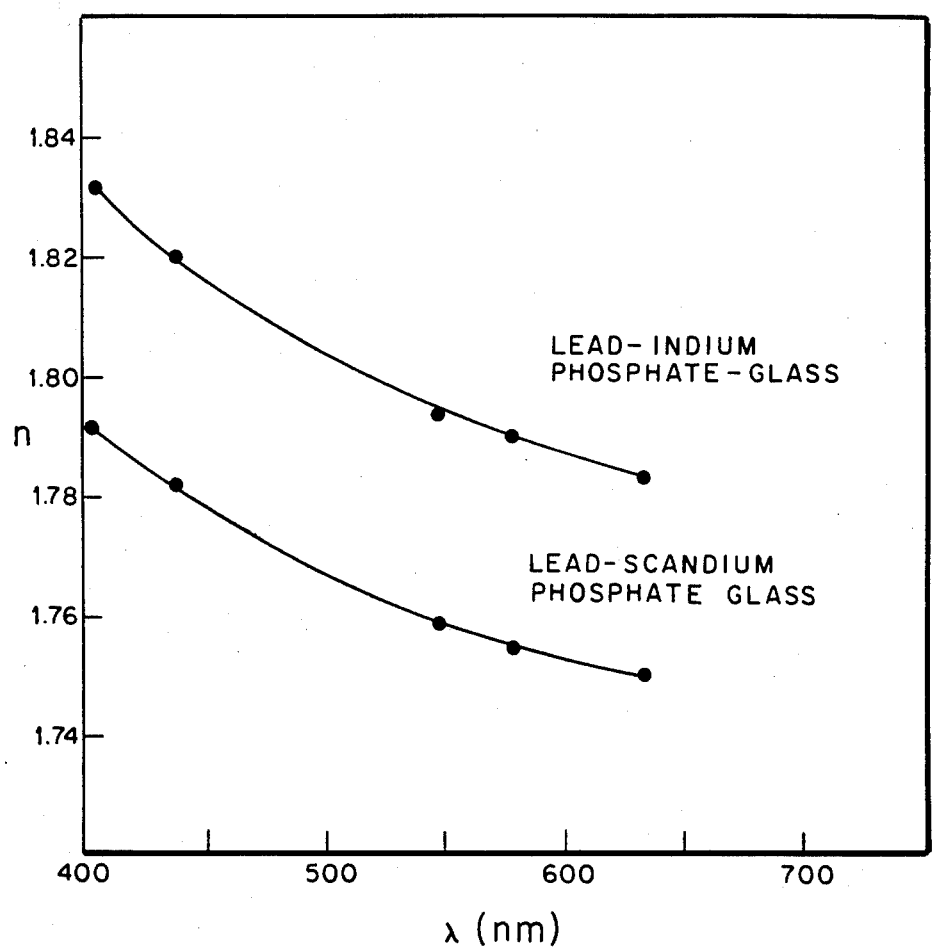

LEAD PHOSPHATE GLASS COMPOSITIONS FOR OPTICAL COMPONENTS

This invention relates to a lead phosphate glass that can be used for optical components and was developed pursuant to a contract with the U. S. Department of Energy.

BACKGROUND OF THE INVENTION

In the past lead phosphate glasses have been of interest primarily because they have low preparation temperatures and the low softening points, characteristics which make them ideal materials for fundamental studies of glass devitrification and the glass transition. However, commercial interest in these glasses was limited because of their poor chemical durability when exposed to aqueous environments. Previous study of these glasses as a nuclear waste containment medium led to the discovery that additions of iron oxide improved the chemical durability without substantially raising either the preparation temperature or affecting the melt viscosity. This improved glass had one major disadvantage; it was black and, therefore, was not suitable for use in the fabrication of optical components requiring the transmission of light. Therefore, there is a need to develop a chemically durable phosphate glass that has a low preparation temperature and melt viscosity, yet is capable of transmitting light.

SUMMARY

In view of the above need, it is an object of this invention to provide a glass having low preparation temperature and melt viscosity that can be used for optical applications.

It is another object of this invention to provide a lead phosphate glass composition having a high index of refraction.

It is another object of this invention to provide a lead phosphate glass composition which exhibits relatively high resistance to aqueous corrosion.

Still a further object of this invention is to provide a lead phosphate glass composition which is transparent, colorless, and castable into a variety of intricate shapes. Other objects and advantages of the invention will be apparent to those skilled in the art from study of the specifications and the appended claims.

The invention is generally described as a composition of matter comprising lead oxide, phosphorus pentoxide and an oxide selected from either indium oxide or scandium oxide or mixtures of the two. The preferred amount of lead oxide is from 55 to 65 weight percent, phosphorus pentoxide from 25 to 40 weight percent, and the two remaining oxides from 2 to 6 weight percent each, or in combination.

The invention is also a process for making lead phosphate glass for optical components by forming a mixture of lead oxide and $P_2O_5$ or a phosphate compound that decomposes to $P_2O_5$, heating the mixture and, after pouring the glass, subsequently cooling at a carefully controlled rate to form the glass. The invention is also a process for casting components from the lead phosphate glass of this invention.

BRIEF DESCRIPTION OF THE DRAWING

Measured index of refraction as a function of wavelength of lead-indium and lead-scandium phosphate glass.

DETAILED DESCRIPTION OF THE PREFERRED EMBODIMENT

Lead phosphate glasses have low melting temperatures and, when melted, viscosity like that of water; however, they corrode when exposed to moisture. It was discovered that the addition of ferric oxide overcame the corrosion problem but rendered a black glass with no optical properties. Applicants investigated the possibility that addition of other oxides to lead phosphate glass would maintain the melt characteristics and also provide a glass with good optical properties. The oxides investigated included MgO, $Al_2O_3$, CaO, $Sc_2O_3$, $TiO_2$, $VO_2$, $CrO_3$, $MnO_2$, CoO, NiO, $Cu_2O$, ZnO, $Ga_2O_3$, $Y_2O_3$, $ZrO_2$, $In_2O_3$, $La_2O_3$, $CeO_2$, and $Gd_2O_3$. Of all the oxides investigated only $In_2O_3$ and $Sc_2O_3$ met the following requirements:

1. The oxides can be dissolved in lead phosphate melt at a reasonable temperature.
2. The chemical durability of the lead phosphate glass is greatly enhanced by the addition of the metal oxide.
3. The resulting glass exhibited no measurable absorption of light with wavelengths between 3,000 and 8,000 A (visible wavelength region).

The failure of the other seventeen oxides tested would suggest neither commonality nor chemical equivalency among oxides.

Of the two suitable additives, the indium oxide not only provides a lead phosphate glass with somewhat better performance and preparation characteristics but also is easier to obtain and less expensive than scandium oxide. However, there is a significant difference in the index of refraction between the lead-indium and the lead-scandium phosphate glass and optical design considerations may make lead-scandium phosphate glass more attractive for some applications.

The $P_2O_5$ component of this invention is preferably derived from a compound that decomposes to $P_2O_5$ since $P_2O_5$ is extremely hygroscopic and difficult to handle. Examples of such a compound include monoammonium phosphate ($NH_4H_2PO_4$) diammonium phosphate $(NH_4)_2HPO_4$, or ammonium orthophosphate $(NH_4)_3PO_4$.

EXAMPLE

Lead-indium and lead-scandium phosphate glasses were prepared by thoroughly mixing together the appropriate amounts of lead oxide, ammonium dihydrogen phosphate ($NH_4H_2PO_4$) and either indium oxide ($In_2O_3$) or scandium oxide ($Sc_2O_3$). The well mixed powders were melted in either an alumina or zirconia crucible at temperatures between 900 and 1000° C. for periods of 20 to 40 hours. The long melting period was necessary to ensure that the resulting glass was free of bubbles and striations. For short periods of time, 1 to 2 hours, the glasses can be melted in platinum crucibles, however, if the molten glass is left in the platinum crucibles for the necessary fining period, 20 to 40 hours, a small amount of platinum, 10 to 100 ppm, will dissolve in the glass and this impurity gives the glass a faint yellow tint. Although some alumina (1000 to 5000 ppm) and some zirconia (1000 ppm) dissolved in the molten glass during the fining period, neither of these metal oxides colored the glass. The molten glass, which could be poured at temperatures as low as 800° C. was cast into a heated mold of boron nitride or graphite. The glass was then annealed for 1 to 2 hours at 425° C. and finally cooled to room temperature for a few hours. The range of compositions of lead-indium phosphate and lead-scandium phosphate glasses found to produce a chemically durable and good quality optical glass are listed in Table 1.

TABLE 1

Optimum Compositions for Lead-Indium Phosphate and Lead-Scandium Phosphate Glasses (All Compositions in wt. %)

| Compound | Lead-Indium Phosphate | Lead-Scandium Phosphate |
| --- | --- | --- |
| PbO | 60–65 | 55–65 |
| $P_2O_5$ (added as $NH_4H_2PO_4$) | 25–30 | 25–40 |
| $In_2O_3$ | 3–6 | — |
| $Sc_2O_3$ | — | 2–6 |

To illustrate the properties of lead-indium phosphate and lead-scandium phosphate glasses, two specific glass compositions were considered. For lead-indium phosphate glasses the composition used was by weight 65 percent PbO, 29 percent $P_2O_5$, 6 percent $In_2O_3$, and for lead-scandium phosphate glasses the composition used was 59 percent PbO, 36 percent $P_2O_5$, and 5 percent $Sc_2O_3$. A summary of the properties of the Pb-In-P glass can be found in Table 2.

TABLE 2

Summary of Experimental Results on Lead-Indium Phosphate Glass.

| | |
| --- | --- |
| Composition (weight %) | 65% PbO, 29% $P_2O_5$, 6% $In_2O_3$ |
| Melting and fining temperature | 900° C. |
| Pouring temperature | 800–900° C. |
| Melting crucibles | Alumina, zirconia |
| Density | 5.4 ± 0.1 g/cm$^3$ |
| Index of refraction | 1.780–1.836 (650–400 nm) |
| Dispersion | Abbe number = 30 ± 1 |
| Thermal expansion coefficient | 12.0 × 10$^{-6}$ (30–380° C.) |
| Glass transition temperature | 436° C. |
| Softening point | 459° C. |
| Chemical durability classes[a] | CR1, FR0, SR 51 |
| Aqueous dissolution rate (25° C.) | <1 × 10$^{-7}$ g/cm$^2$-day (5 < pH < 9) |
| Aqueous dissolution rate (90° C.) | <1 × 10$^{-7}$ g/cm$^2$-day (5 < pH < 9) |
| Critical cooling rate[b] | 10° C./min |

[a]See introduction of optical catalog of Schott Glass for definitions of durability classes.
[b]The slowest rate at which the glass can be cooled without bulk crystallization.

Optical absorption measurements were made on lead-indium phosphate glass and lead-scandium phosphate glass using a Cary spectrophotometer. The ulraviolet absorption edge for these glasses was about 300 nm and both glasses began to strongly absorb in the infrared at about 2800 nm. In the visible range between 350 nm and 2500 nm there were no absorption bands and no measurable absorption within the limitation of this type measurement.

Prisms of lead-indium phosphate and lead-scandium phosphate glasses were cut and polished and the the index of refraction was measured for both glasses. The measured index of refraction as a function of wavelength for the glasses is shown in FIG. 1.

Chemical durability tests were carried out using the lead-indium phosphate glass since preliminary tests on both types of glasses indicated that the lead-scandium phosphate glasses had slightly poorer corrosion resistance relative to the lead-indium phosphate glasses. Polished slices of both glasses were exposed to a water saturated atmosphere with temperatures alternating between 45 and 55° C. in approximately 1 hour cycles. Even after 180 hours of exposure the lead-indium phosphate glass exhibited no or only slight signs of deterioration due to changing climatic conditions.

Resistance to staining tests consisted of exposing a polished slice of lead-indium phosphate glass to a small quantity of either a standard acetate solution, pH =4.6, or to a sodium acetate buffer, pH =5.6. Interference color stains would develop if the glass were decomposed by the test solution. The lead-indium phosphate glasses exhibited virtually no interference color staining even after 100 hours of exposure to the standard acetate solution.

An acid resistance test consisted of exposing a polished slice of lead-indium phosphate glass to a strong acid solution, 0.5 N $HNO_3$, at 25° C. and measuring the time necessary to dissolve 0.1 microns of glass. After 6 minutes of exposure there was a slight frosting of the glass surface. Further acid resistance tests were conducted by exposing several slices of lead-indium phosphate glasses to distilled water, and HF solutions of pH 2, pH 3 solution, pH 11 solution, and pH 12. No buffering agent was used, and the pH value quoted refers to the initial pH of the corroding solution. The lead-indium phosphate glasses were corroded in teflon containers for a period of 1 week at both 25 and 90° C. with the ratio of the surface area of the glass sample to the volume of the liquid fixed at 0.1cm$^{-1}$. The quantitative analysis for lead and phosphorus of each solution indicated that for solutions with a pH between 4 and 10, the lead-indium phosphate glasses have excellent corrosion resistance even at temperatures of 90° C.

Thermal expansion characteristics were also made of this lead-indium phosphate glass and also lead-scandium phosphate glass and the results indicated that both glasses have an unusually large coefficient of thermal expansion for glasses with such good chemical durability.

It is well known that, in general, phosphate glasses are more susceptible to crystallization than are silicate glasses. The tendency of phosphate glasses to crystallize frequently limits the size of glass article that can be cast and it is, therefore, necessary to understand the characteristics of crystallization of these glasses in order to have a commercial application. Tests indicated that the lead-indium phosphate glass should be cooled through the temperature range between 560 and 660° C. at a rate greater than 10° C./min to avoid any cyrstallization. Therefore, it should be possible to cast lead-indium phosphate glass block measuring approximately 10×10×10 cm without encountering any problem due to crystallization. If a larger piece of glass is needed, one dimension of the glass must be reduced or the lead and/or indium content of the glass must be reduced which will result in a slight reduction of aqueous corrosion resistance. The low viscosity permits easy pouring into molds of precise dimensions and intricate shapes. To cast components, the glass is melted to about 800° C. or above and poured into a suitable mold such as graphite, boron nitride, steel or the like. This is then cooled following the critical cooling rate described above and subsequently annealed at about 400° to 450° C. for one to two hours.

Experimental results demonstrate many beneficial properties of the new glasses including their low preparation temperatures; the low melt viscosity, making them very easy to pour and cast; the high relative coefficient of thermal expansion; a relatively high index of refraction and moderate dispersion; and unusually good chemical durability.

We claim:

1. A glass composition of matter comprising lead oxide from 55 to 65 wt percent, posphorous petoxide from 25 to 40 wt percent and a third oxide selected from the group indium oxide or scandium oxide from 2 to 6 wt. percent.

2. A process for making a lead phosphate glass composition comprising: forming a mixture of from 55 to 65 wt percent lead oxide, 25 to 40 wt percent phosphorous pentoxide and from 2 to 6 wt percent of a third oxide selected from the group indium oxide and scandium oxide; heating said mixture to between 900 and 1000° C. for approximately 20 to 40 hours; pouring said mixture at a temperature not below 800° C. into a heated mold that will not react with said mixture; ensuring that the rate of cooling of said mixture between 560 and 660° C. is not less than 10° C. per minute; annealing about 1 to 2 hours at about 400° to 450° C.; cooling to room temperature.

* * * * *